United States Patent
Ogawa et al.

(10) Patent No.: US 8,604,804 B2
(45) Date of Patent: *Dec. 10, 2013

(54) METHOD AND STRUCTURE OF WINDING OF STATOR FOR ROTATION DETECTOR, AND ELECTRIC MOTOR COMPRISING ROTATION DETECTOR

(75) Inventors: Takashi Ogawa, Osaka (JP); Yuichi Yoshikawa, Osaka (JP); Yasuji Echizen, Osaka (JP); Masahiko Kobayashi, Hyogo (JP); Masaaki Nishiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/702,921

(22) PCT Filed: Apr. 12, 2011

(86) PCT No.: PCT/JP2011/002151
§ 371 (c)(1),
(2), (4) Date: Dec. 7, 2012

(87) PCT Pub. No.: WO2011/158415
PCT Pub. Date: Dec. 22, 2011

(65) Prior Publication Data
US 2013/0088127 A1 Apr. 11, 2013

(30) Foreign Application Priority Data
Jun. 18, 2010 (JP) ................. 2010-138849

(51) Int. Cl.
*G01R 31/06* (2006.01)
(52) U.S. Cl.
USPC ...... 324/546; 324/545; 324/207.15; 310/112; 310/114; 310/266; 310/156.36; 310/156.37

(58) Field of Classification Search
USPC .......... 324/207.15, 207.18, 207.25, 173–174, 324/200–263, 545–546; 73/488–520.01; 701/41–43; 702/94, 151; 310/112, 114, 310/266, 156.36, 156.37
See application file for complete search history.

(56) References Cited

U.S. PATENT DOCUMENTS

| 4,107,583 A * | 8/1978 | Houtman .................. 318/781 |
| 7,215,116 B2 | 5/2007 | Nishimura |

(Continued)

FOREIGN PATENT DOCUMENTS

| CN | 1776353 A | 5/2006 |
| JP | 2003-209942 A | 7/2003 |
| JP | 2006-125995 A | 5/2006 |
| WO | WO 2007/029678 A1 | 3/2007 |

OTHER PUBLICATIONS

International Search Report for International Application No. PCT/JP2011/002151, dated Jul. 12, 2011, 1 page.

(Continued)

*Primary Examiner* — Arleen M Vazquez
*Assistant Examiner* — Son Le
(74) *Attorney, Agent, or Firm* — Brinks Gilson & Lione

(57) ABSTRACT

The $N_1(s)$ turns of an output winding is divided by a split ratio α into $N_{1a}(s)$ turns of an output winding (1a) and $N_{1b}(s)$ turns of an output winding (1b). The output winding (1a) is continuously wound around all slots as the undermost layer. Output winding 2, which is different in phase by 90 degrees from the output winding (1a), is continuously wound around all the slots over the output winding (1a). An output winding (1b) is continuously wound around all the slots over output winding 2. This equalizes the contribution of the output winding and output winding 2 to the flux linkage, thereby achieving high angle detection accuracy.

6 Claims, 8 Drawing Sheets

(56) References Cited

U.S. PATENT DOCUMENTS

| | | |
|---|---|---|
| 2006/0119352 A1 | 6/2006 | Nishimura |
| 2009/0134735 A1* | 5/2009 | Yoshikawa et al. ........... 310/198 |
| 2009/0134739 A1* | 5/2009 | Akita ............................ 310/216 |
| 2013/0043864 A1* | 2/2013 | Ogawa et al. ............ 324/207.15 |

OTHER PUBLICATIONS

Office Action in corresponding Chinese Application No. 201180030128.7, and partial English translation thereof, dated Jul. 30, 2013, 9 pages.

* cited by examiner

METHOD AND STRUCTURE OF WINDING OF STATOR FOR ROTATION DETECTOR, AND ELECTRIC MOTOR COMPRISING ROTATION DETECTOR

This application is a 371 application of PCT/JP2011/002151 having an international filing date of Apr. 12, 2011, which claims priority to JP2010-138849 filed Jun. 18, 2010, the entire contents of which are incorporated herein by reference.

TECHNICAL FIELD

The present invention relates to a method and structure of winding of a stator for rotation detector, and an electric motor including a rotation detector.

BACKGROUND ART

A conventional winding method of a stator for rotation detector is disclosed in Patent Literature 1. FIG. 9 is a configuration of the winding method of a stator shown in Patent Literature 1. In this method, output winding 101 and output winding 102, which are different in phase from each other, are wound around slots defined by magnetic poles. Output winding 101 is wound around every other slot. Output winding 102 is wound around all slots over output winding 101. Then, output winding 101 is wound over output winding 102 around the slots that do not have output winding 101 as the undermost layer. When the windings around the slots are viewed in cross section, the order of winding output windings 101 and 102 is alternated from one slot to the next. In FIG. 9, the conventional stator for rotation detector includes stator core 103.

According to this method, output windings 101 and 102 can be misaligned so as to reduce variation between an output signal A from output winding 101 and an output signal B from output winding 102, thereby having high detection accuracy of a rotation angle.

There are, however, following problems with the aforementioned winding method of Patent Literature 1.

In the rotation detector of this type, in principle, the output signals have different amplitudes depending on their rotation angles. Hence, the number of turns of the output windings around the slots needs to be varied sinusoidally. This causes the contribution to the flux linkage between these output windings to be different from slot to slot. As a result, the winding method of Patent Literature 1 has limitations in reducing the imbalance of contribution to the flux linkage between these output windings.

More specifically, assume that output winding 101 has the same number of turns in all slots, and output winding 102 also has the same number of turns in all slots. Then, the contribution to the flux linkage can be equalized between output windings 101 and 102 in all slots by alternating the order of winding them from one slot to the next, thereby reducing variation between the output signals. In the rotation detector of the present invention, however, the number of turns of each output winding around the slots needs to be varied sinusoidally as described above. Thus, since the number of turns of each output winding differs from slot to slot, it is difficult to equalize the contribution to the flux linkage between output windings 101 and 102 only by alternating the order of winding them from one slot to the next.
Patent Literature 1: Japanese Patent No. 3681167

SUMMARY OF THE INVENTION

In the winding method of a stator for rotation detector according to the present invention, the stator includes a stator core that is ring shaped and has a plurality of magnetic poles, which are arranged at regular intervals in the circumferential direction and project either to the inner diameter side or the outer diameter side of the stator core. The stator core has a first output winding and a second output winding, which are different in phase by 90 degrees from each other and are wound around slots defined by magnetic poles. The first output winding has $N1(s)$ turns, and the second output winding has $N2(s)$ turns, each of the $N1(s)$ turns and the $N2(s)$ turns being varied sinusoidally through the slots. The $N1(s)$ turns of the first output winding is divided by a split ratio $\alpha$ into $N1a(s)$ turns and $N1b(s)$ turns. A lower-layer first output winding having the $N1a(s)$ turns is continuously wound, as the undermost layer, around all slots. The second output winding is continuously wound around all slots over the lower-layer first output winding. An upper-layer first output winding having the $N1b(s)$ turns is continuously wound around all slots over the second output winding.

In the winding structure of a stator for rotation detector according to the present invention, the stator includes a stator core that is ring shaped and has a plurality of magnetic poles, the magnetic poles being arranged at regular intervals in a circumferential direction and projecting either to an inner diameter side or an outer diameter side of the stator core, the stator core having a first output winding and a second output winding, which are different in phase by 90 degrees from each other and are wound around slots defined by the adjacent magnetic poles. The first output winding has $N1(s)$ turns, and the second output winding has $N2(s)$ turns, each of the $N1(s)$ turns and the $N2(s)$ turns being varied sinusoidally through the slots. The $N1(s)$ turns of the first output winding is divided by a split ratio $\alpha$ into $N1a(s)$ turns and $N1b(s)$ turns. The winding structure includes: a lower-layer first output winding which is continuously wound $N1a(s)$ turns, as an undermost layer, around all the slots; the second output winding which is continuously wound around all the slots over the lower-layer first output winding; and an upper-layer first output winding which is continuously wound $N1b(s)$ turns around all the slots over the second output winding.

The electric motor according to the present invention includes the rotation detector employing the above-described winding method.

According to the present invention, the number of turns of the first output winding is divided by a given split ratio $\alpha$. As a result, a balance is struck in the contribution to the flux linkage between the first output winding and the second output winding, thereby reducing variation between the output signals A and B. This results in reducing variation between angular signals generated from the output signals A and B, thereby achieving high angle detection accuracy.

DETAILED DESCRIPTION OF THE PREFERRED EMBODIMENTS

A winding method of a stator for rotation detector according to the present invention will now be described as preferred embodiments.

First Exemplary Embodiment

Figure 1:
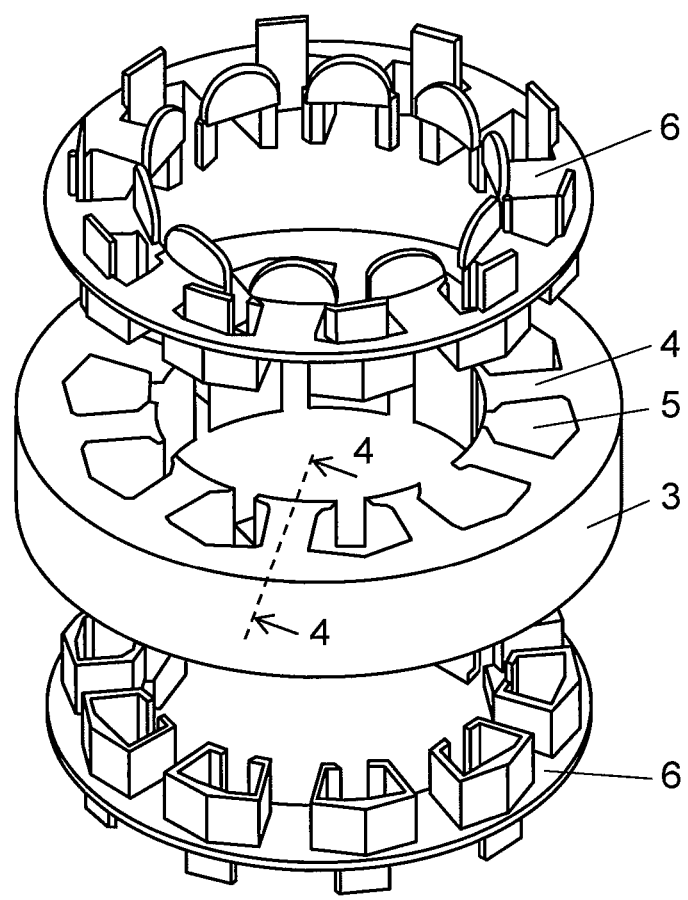
FIG. 1 shows an overall view of a stator for rotation detector according to a first exemplary embodiment of the present invention.
Figure 2:
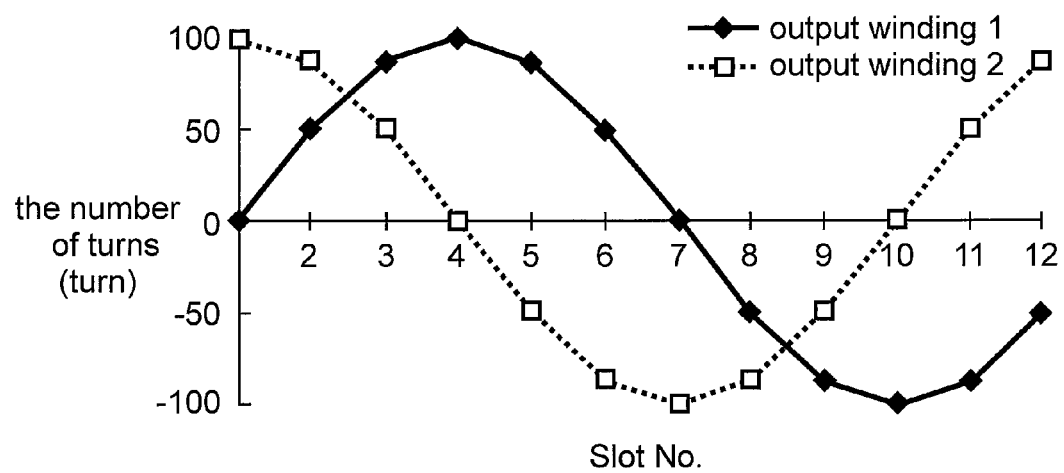
FIG. 2 shows the distributions of the numbers of turns of output windings in the stator for rotation detector according to the first exemplary embodiment.

FIG. 1 shows a stator for rotation detector according to a first exemplary embodiment of the present invention. As shown in FIG. 1, the stator for rotation detector according to the first exemplary embodiment includes stator core 3, windings (not shown), and insulators 6. Stator core 3 is ring shaped, and has magnetic poles 4, which are arranged at regular intervals in the circumferential direction and project either to the inner diameter side or to the outer diameter side of stator core 3. The windings are wound around slots 5 defined by the magnetic poles. Insulators 6 are arranged in such a manner as to cover stator core 3 from both sides in the axial direction, thereby electrically insulating between stator core 3 and the windings. The windings, which are not illustrated in FIG. 1, consist of output winding 1 (first output winding) and output winding 2 (second output winding). Output winding 1 generates a sinusoidal output signal A according to the rotation angle. Output winding 2 generates a sinusoidal output signal B, which is different in phase by 90 degrees from the signal A. The number of turns of each of output windings 1 and 2 around the slots is varied sinusoidally, so that output windings 1 and 2 generate the output signals A and B, respectively. FIG. 2 shows the distributions of the numbers of turns of the output windings. These distributions are merely one example; output windings 1 and 2 have only to be different in phase by 90 degrees from each other.

Figure 3:
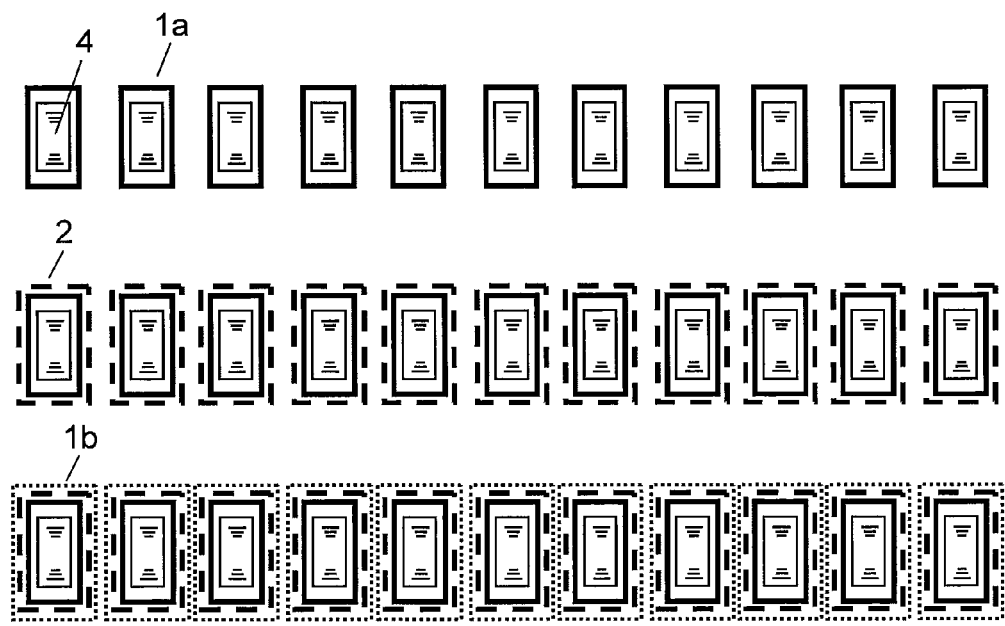
FIG. 3 is a configuration of a winding method of the stator for rotation detector according to the first exemplary embodiment.

FIG. 3 is a configuration of the winding method of the stator for rotation detector according to the first exemplary embodiment. As shown in FIG. 3, output winding 1 has N1(s) turns, which is varied sinusoidally through the slots. The N1(s) turns is divided by a split ratio α into N1a(s) turns of output winding 1a (lower-layer first output winding) and N1b(s) turns of output winding 1b (upper-layer first output winding). Output winding 1a having the N1a(s) turns is continuously wound, as the undermost layer, around all slots. Output winding 2 is continuously wound around all slots over output winding 1a. Output winding 1b having the N1b(s) turns is continuously wound around all slots over output winding 2. The end of output winding 1a is electrically connected to the start of output winding 1b.

Figure 4:
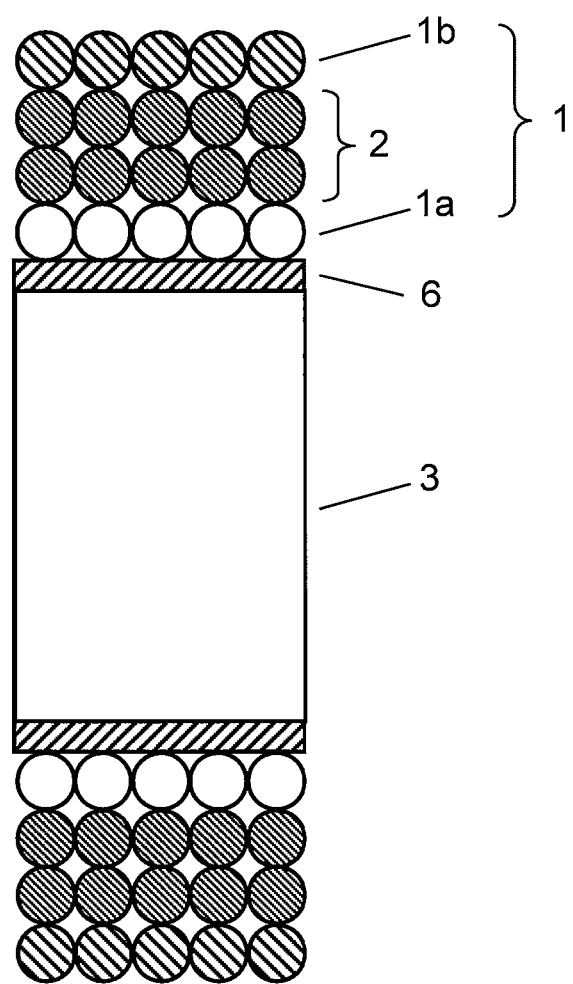
FIG. 4 is a cross sectional view of the output windings of the stator for rotation detector according to the first exemplary embodiment.

FIG. 4 is a cross sectional view of the stator for rotation detector taken along surface 4-4 of FIG. 1. As shown in FIG. 4, in the winding method of the stator for rotation detector according to the first exemplary embodiment, output winding 1 is disposed over and under output winding 2 in stator core 3 so as to sandwich output winding 2. In this configuration, the split ratio α can be adjusted to adjust the contribution to the flux linkage between output windings 1 and 2 and the impedance of these windings. This results in reducing variation between output signals A and B, thereby achieving high detection accuracy of a rotation angle.

The following is a description of the results of experiments performed to confirm effects of the first exemplary embodiment of the present invention.

Figure 5:
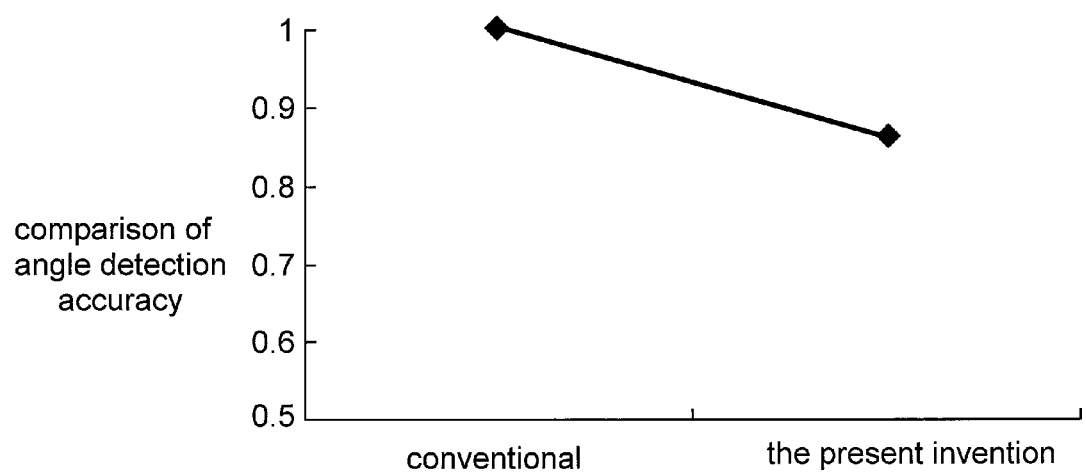
FIG. 5 is a comparison diagram of angle detection accuracy between a conventional rotation detector and the rotation detector according to the first exemplary embodiment.

Angle detection accuracy was compared between the conventional winding method shown in Patent Literature 1 and the winding method according to the first exemplary embodiment of the present invention. These methods are equal in the number of slots in the stator core, and in the numbers of turns of output windings 1 and 2 in each slot. FIG. 5 is a comparison diagram of angle detection accuracy between the conventional winding method and the winding method according to the present invention. The diagram indicates that the winding method according to the present invention has a smaller error in angle detection by 14% than the conventional winding method. This means that the winding method according to the first exemplary embodiment can provide a rotation detector with higher angle detection accuracy.

Furthermore, adjusting the split ratio α individually from slot to slot can adjust the contribution to the flux linkage only in the slots having a large error in angle detection. As a result, the contribution to the flux linkage through the slots can be minutely adjusted. This can reduce variation between the output signals A and B, thereby achieving high angle detection accuracy.

Figure 6:
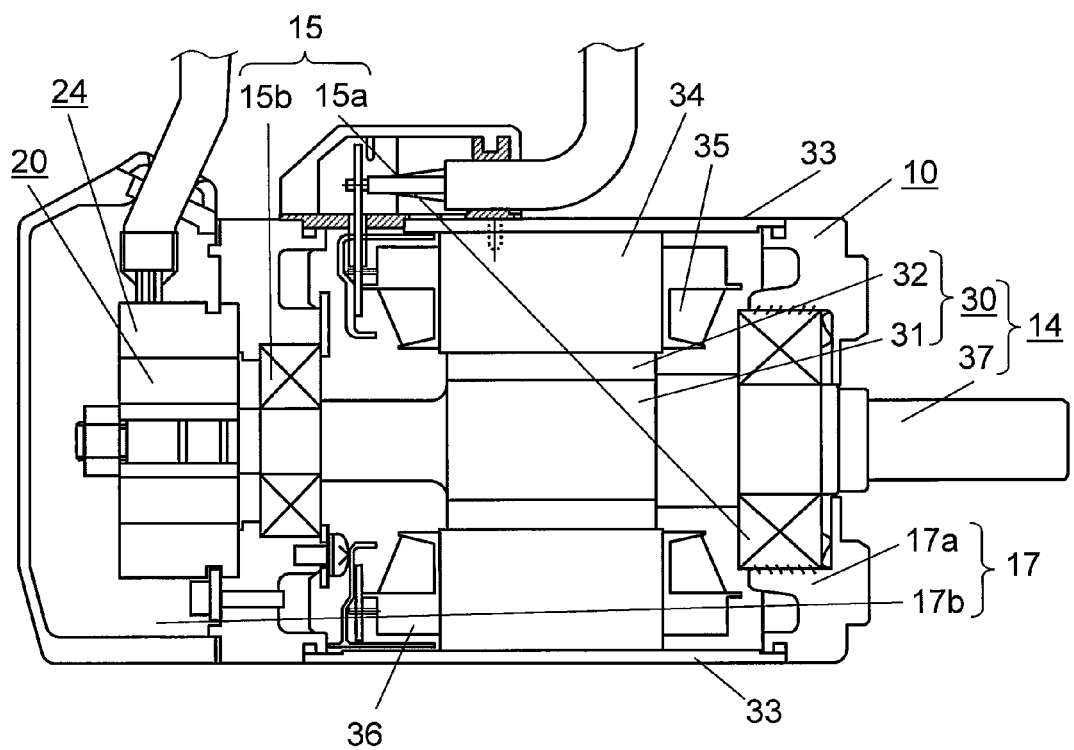
FIG. 6 is a cross sectional view of an electric motor according to the first exemplary embodiment.

FIG. 6 is a cross sectional view of an electric motor according to the first exemplary embodiment. The electric motor of the present exemplary embodiment includes the stator for rotation detector shown in FIG. 1. As an example of the electric motor, the present exemplary embodiment will describe an FA (Factory Automation) servomotor. The servomotor used in the present exemplary embodiment is of inner rotor type in which a rotor is rotatably disposed on the inner periphery side of the stator.

In FIG. 6, the electric motor includes a stator for rotation detector) having stator core 34. Around stator core 34, stator winding 35 is wound as an output winding via insulators 36, which are resins to insulate stator core 34. Stator core 34 is shrink fitted into frame 33 with other fixing members. In the present exemplary embodiment, these components are shrink fitted so as to form stator (of the electric motor) 10 having a substantially square contour.

The motor further includes rotor 14 inserted into the inside of stator 10 via a gap. Rotor 14 includes disk-shaped rotation body 30 and shaft 37. Rotation body 30 includes rotor core 31. Shaft 37 penetrates through the center of rotation body 30 so as to fasten rotation body 30. Rotor core 31 includes permanent magnets, which are arranged in the circumferential direction and are opposite to the inner periphery side of stator 10. In the structure of FIG. 6, rotor core 31 and permanent magnets 32 are adhesively bonded to each other. Thus, the inner periphery side of stator 10 and the outer periphery side of rotation body 30 are opposite to each other.

Shaft 37 of rotor 14 is supported by two bearings 15, which are cylindrical and include iron balls. The inner rings of bearings 15 are fixed to shaft 37. In FIG. 6, shaft 37 is supported by bearing 15a on the output side on which shaft 37 projects from the body of the brushless motor, and is supported by bearing 15b on the other side. The outer ring of bearing 15a on the output side is fixed with conductive metal bracket 17a. The outer ring of bearing 15b on the side opposite to the output side is fixed with conductive metal bracket 17b. Thus, shaft 37 is supported by two bearings 15 so as to rotate rotor 14.

Second Exemplary Embodiment

Figure 7:
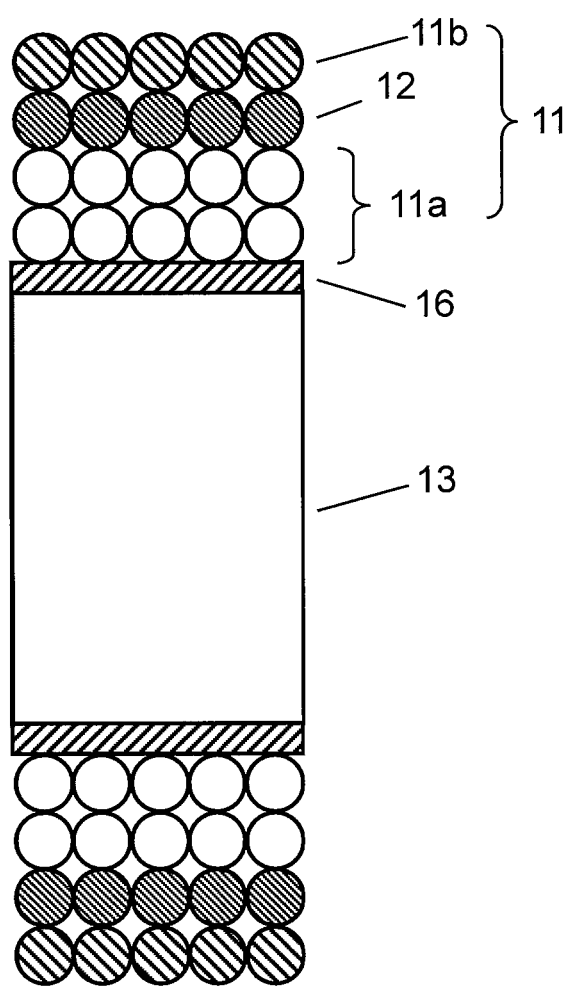
FIG. 7 is a cross sectional view of output windings in the stator for rotation detector according to a second exemplary embodiment of the present invention.

FIG. 7 is a cross sectional view of output windings in the stator for rotation detector according to a second exemplary embodiment of the present invention. As shown in FIG. 7, in the winding method of the stator for rotation detector according to the second exemplary embodiment, output winding 11 (first output winding) has $N11(s)$ turns, and output winding 12 (second output winding) has $N12(s)$ turns, each of the $N11(s)$ turns and the $N12(s)$ turns being varied sinusoidally through the slots. The $N11(s)$ turns is divided by the split ratio $\alpha$ into $N11a(s)$ turns of output winding 11a (lower-layer first output winding) and $N11b(s)$ turns of output winding 11b (upper-layer first output winding). The $N11a(s)$ turns is larger than the $N11b(s)$ turns. Output winding 11a having the $N11a(s)$ turns is continuously wound, as the undermost layer, around all slots. Output winding 12 is continuously wound around all slots over winding 11a. Output winding 11b having the $N11b(s)$ turns is continuously wound around all slots over output winding 12. The end of output winding 11a is electrically connected to the start of output winding 11b. The stator for rotation detector according to the present exemplary embodiment further includes stator core 13 and insulators 16.

In the case where output winding 12 has a larger contribution to the flux linkage than output winding 11, output winding 11 is wound a larger number of turns at the undermost layer than at the third layer. This increases the contribution of output winding 11a to the flux linkage, thereby equalizing the contribution between output windings 11 and 12. This results in reducing variation between the output signals A and B, thereby achieving high detection accuracy of a rotation angle.

Third Exemplary Embodiment

Figure 8:
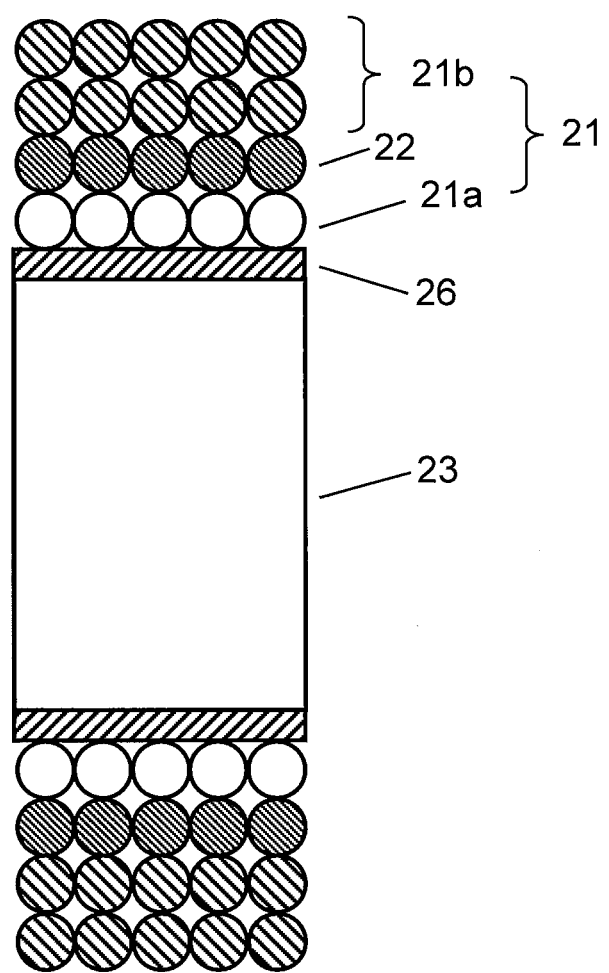
FIG. 8 is a cross sectional view of output windings in the stator for rotation detector according to a third exemplary embodiment of the present invention.
Figure 9:
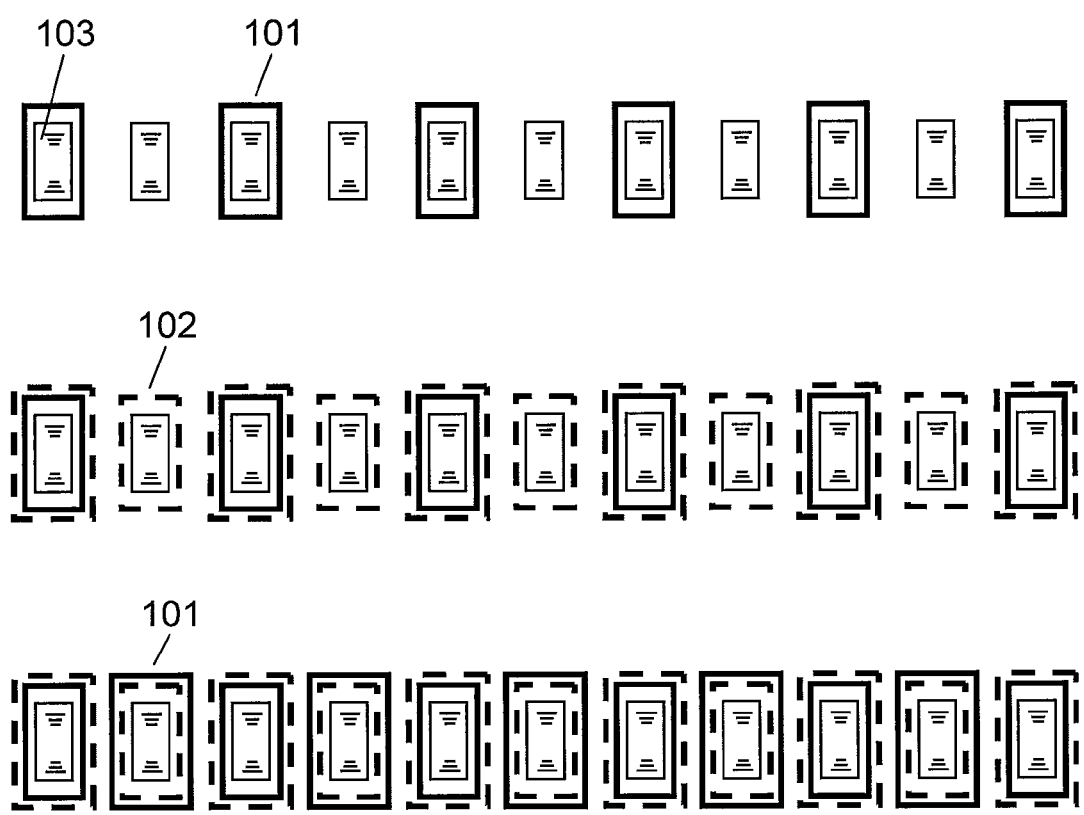
FIG. 9 is a configuration of a winding method of a conventional stator for rotation detector.

FIG. 8 is a cross sectional view of the output windings in the stator for rotation detector according to a third exemplary embodiment of the present invention. As shown in FIG. 8, in the winding method of the stator for rotation detector according to the third exemplary embodiment, output winding 21 (first output winding) has $N21(s)$ turns, and output winding 22 (second output winding) has $N22(s)$ turns, each of the $N21(s)$ turns and the $N22(s)$ turns being varied sinusoidally through the slots. The $N21(s)$ turns is divided by the split ratio $\alpha$ into $N21a(s)$ turns of output winding 21a (lower-layer first output winding) and $N21b(s)$ turns of output winding 21b (upper-layer first output winding). The $N21a(s)$ turns is smaller than the $N21b(s)$ turns. Output winding 21a having the $N21a(s)$ turns is continuously wound, as the undermost layer, around all slots. Output winding 22 is continuously wound around all slots over output winding 21a. Output winding 21b having the $N21b(s)$ turns is continuously wound around all slots over output winding 22. The end of output winding 21a is electrically connected to the start of output winding 21b. The stator for rotation detector according to the present exemplary embodiment further includes stator core 23 and insulators 26.

In the case where output winding 21 has a larger contribution to the flux linkage than output winding 22, output winding 21 is wound a larger number of turns at the third layer than at the undermost layer. This reduces the contribution of output winding 21a to the flux linkage, thereby equalizing the contribution between output windings 21 and 22. This results in reducing variation between the output signals A and B, thereby achieving high detection accuracy of a rotation angle.

The first to third exemplary embodiments are merely exemplary; the present invention is not limited to these embodiments and can be properly modified.

For example, the stator for rotation detector in the first to third exemplary embodiments is inner rotor type having stator teeth (salient poles) on the inner circumference surface side of the stator core. Alternatively, the stator for rotation detector of the present invention may be outer rotor type having the stator teeth on the outer circumference surface side of the stator core.

The number of the stator teeth in the stator core according to the first to third exemplary embodiments is not limited to 12; it may be more or less than 12.

In the stator for rotation detector according to the first to third exemplary embodiments, only output windings are wound; alternatively, excitation windings for generating excitation signals may be wound under the output windings.

As described hereinbefore, in the winding method of the stator for rotation detector according to the present invention, the stator includes a stator core that is ring shaped and has magnetic poles, which are arranged at regular intervals in the circumferential direction and project either to the inner diameter side or to the outer diameter side of the stator core. The stator core has output winding 1 and output winding 2, which are different in phase by 90 degrees from each other and wound around the slots defined by magnetic poles. Output winding 1 has $N1(s)$ turns, and output winding 2 has $N2(s)$ turns, each of the $N1(s)$ turns and the $N2(s)$ turns being varied sinusoidally through the slots. The $N1(s)$ turns of output winding 1 is divided by a split ratio $\alpha$ into $N1a(s)$ turns and $N1b(s)$ turns. Output winding 1a having the $N1a(s)$ turns is continuously wound, as the undermost layer, around adjacent slots. Output winding 2 is continuously wound around adjacent slots over output winding 1a. Output winding 1b having the $N1b(s)$ turns is continuously wound around adjacent slots over output winding 2.

Thus, adjusting the split ratio $\alpha$ results in adjusting the distance between each of output windings 1, 2 and the magnetic flux flowing through the magnetic poles, thereby adjusting the contribution to the flux linkage between output windings 1 and 2. As a result, the contribution to the flux linkage can be equalized between output windings 1 and 2 in all slots so as to reduce variation between the output signal A from output winding 1 and the output signal B from output winding 2, thereby achieving high angle detection accuracy.

In the winding method of the stator for rotation detector according to the present invention, it is desirable that the split ratio $\alpha$ be different at each one of the slots.

According to the detection principle, in the rotation detector of the present invention, the detection accuracy of a rotation angle varies depending on the machining accuracy and assembly accuracy of the core, and winding variation. Hence, the contribution to the flux linkage between output windings 1 and 2 can be minutely adjusted by adjusting the split ratio in each slot so as to reduce variation between the output signals A and B, thereby achieving high angle detection accuracy.

Furthermore, in the winding method of the stator for rotation detector according to the present invention, it is desirable that output winding 1 be wound in such a manner that the $N1a(s)$ turns is larger than the $N1b(s)$ turns.

In the case where output winding 1 has a smaller contribution to the flux linkage than output winding 2, output winding 1 is wound in such a manner that the $N1a(s)$ turns can be larger than the $N1b(s)$ turns. As a result, output winding 1 can be wound a large number of turns in a position near the teeth.

This relatively increases the contribution of output winding 1 to the flux linkage, thereby being balanced with the contribution of output winding 2. This results in reducing variation between the output signals A and B, thereby achieving high angle detection accuracy.

In the wiring method of the stator for rotation detector according to the present invention, it is desirable that output winding 1 be wound in such a manner that the N1a(s) turns is smaller than the N1b(s) turns.

In the case where output winding 1 has a larger contribution to the flux linkage than output winding 2, output winding 1 is wound in such a manner that the N1a(s) turns can be smaller than the N1b(s) turns. As a result, output winding 1 can be wound a large number of turns in a position distant from the teeth. This relatively reduces the contribution of output winding 1 to the flux linkage, thereby being balanced with the contribution of output winding 2. This results in reducing variation between the output signals A and B, thereby achieving high angle detection accuracy.

INDUSTRIAL APPLICABILITY

Thus, the present invention provides a stator for rotation detector which has output signals with low variation. This stator for rotation detector can be mounted on various electrical devices such as resolvers for detecting the rotation angle of the shaft of an electric motor.

The invention claimed is:

1. A winding method of a stator for rotation detector, the stator including a stator core that is ring shaped and has a plurality of magnetic poles, the magnetic poles being arranged at regular intervals in a circumferential direction and projecting either to an inner diameter side or an outer diameter side of the stator core, the stator core having a first output winding and a second output winding, which are different in phase by 90 degrees from each other and are wound around slots defined by the magnetic poles, wherein the first output winding has N1(s) turns, and the second output winding has N2(s) turns, each of the N1(s) turns and the N2(s) turns being varied sinusoidally through the slots;

the N1(s) turns of the first output winding is divided by a split ratio α into N1a(s) turns and N1b(s) turns;

a lower-layer first output winding having the N1a(s) turns is continuously wound, as an undermost layer, around all the slots;

the second output winding is continuously wound around all the slots over the lower-layer first output winding; and an upper-layer first output winding having the N1b(s) turns is continuously wound around all the slots over the second output winding.

2. The winding method of the stator for rotation detector of claim 1, wherein the split ratio α is different at each one of the slots.

3. The winding method of the stator for rotation detector of claim 2, wherein the first output winding is divided by the split ratio α in such a manner that the N1a(s) turns is larger than the N1b(s) turns.

4. The winding method of the stator for rotation detector of claim 2, wherein the first output winding is divided by the split ratio α in such a manner that the N1a(s) turns is smaller than the N1b(s) turns.

5. A winding structure of a stator for rotation detector, the stator including a stator core that is ring shaped and has a plurality of magnetic poles, the magnetic poles being arranged at regular intervals in a circumferential direction and projecting either to an inner diameter side or an outer diameter side of the stator core, the stator core having a first output winding and a second output winding, which are different in phase by 90 degrees from each other and are wound around slots defined by the adjacent magnetic poles, wherein the first output winding has N1(s) turns, and the second output winding has N2(s) turns, each of the N1(s) turns and the N2(s) turns being varied sinusoidally through the slots; and the N1(s) turns of the first output winding is divided by a split ratio α into N1a(s) turns and N1b(s) turns, wherein the winding structure comprises:

a lower-layer first output winding which is continuously wound N1a(s) turns, as an undermost layer, around all the slots;

the second output winding which is continuously wound around all the slots over the lower-layer first output winding; and an upper-layer first output winding which is continuously wound N1b(s) turns around all the slots over the second output winding.

6. An electric motor comprising a stator having the winding structure defined in claim 5 for a rotation detector.

* * * * *